United States Patent Office 3,222,420
Patented Dec. 7, 1965

3,222,420
CURABLE COATING COMPOSITION COMPRISING COPOLYMER CONTAINING GRAFTED CARBOXYL GROUPS AND EPOXY RESIN
Robert Louis Heppolette, McMasterville, Quebec, Canada, assignor to Canadian Industries Limited, Montreal, Quebec, Canada, a corporation of Canada
No Drawing. Filed July 13, 1961, Ser. No. 123,643
Claims priority, application Great Britain, July 19, 1960, 25,141/60
3 Claims. (Cl. 260—837)

This invention relates to coating compositions and, more particularly, to coating compositions which may be heated after application to substrates to give hard, infusible films.

Such coating compositions are disclosed, for example, in Canadian Patent Nos. 534,002, 534,261 and 569,430. They comprise a copolymer of styrene or vinyl toluene, acrylate and/or methacrylate esters and 2% to 15% of acrylic or methacrylic acids, together with a polyepoxide, either monomeric or resinous, and a basic catalyst. On baking, these coating compositions become hard and infusible by a well known reaction, i.e. the base-catalysed reaction of the epoxide groups in the polyepoxide with the free carboxylic acid groups of the copolymer. By this reaction the polymer chains are cross-linked to yield an infusible coating which has very desirable properties and is glossy, scratch resistant and not easily attacked by solvents or detergents.

However, the above coatings lack the extreme flexibility that is required in applications where a metal is to be formed after coating, or where a coated article is dented and must be beaten out. Such flexibility can be obtained by greatly increasing the amount of acrylate ester in the copolymer, but such increase has a corresponding deleterious effect on the hardness and solvent, grease, and detergent resistance of the coating obtained.

It is thus an object of this invention to provide coating compositions comprising an acid-containing copolymer and a polyepoxide which, on baking, give hard, infusible flexible films. Further objects are to provide such films attached to metal substrates, and to provide a process for making such compositions and films. Additional objects will appear hereinafter.

The coating compositions of this invention comprise essentially a copolymer of ethylenically unsaturated monomers including between 2% and 15% by weight of an $\alpha,\beta$-unsaturated acid and 85% to 98% by weight of neutral monomers, said monomers having been copolymerized in the presence of from 2% to 20% by weight of a rigid polymeric resin, from 5% to 55% by weight of the copolymer of a polyepoxide, and a basic catalyst.

Such compostions, when applied to a suitable substrate such as aluminum or phosphated steel and baked thereon at a temperature between 110° C. and 200° C., give infusible coatings which possess the hitherto contradictory properties of hardness and flexibility.

Thus the process of this invention comprises, essentially, copolymerizing copolymerizable ethylenically unsaturated monomers including between 2% and 15% by weight of an $\alpha,\beta$-unsaturated acid in the presence of from 2% to 20% by weight of a rigid polymeric resin, mixing the so-formed copolymer with from 5% to 55%, by weight of the copolymer, of a polyepoxide and a basic catalyst, applying the mixture as a coating film to a substrate and baking said film to yield a hard infusible coating.

The rigid polymeric resins for use in the coating compositions of this invention, in the presence of which the unsaturated monomers are polymerized, comprise homopolymers and copolymers of ethylenically unsaturated monomers, which polymers are solid and substantially rigid at room temperatures. They are thus contrasted with rubbery polymers. Such rigid resins include homopolymers and copolymers containing a major proportion of styrene, substituted styrenes such as vinyl toluene and $\alpha$-methyl styrene, mono-olefines such as ethylene and propylene, and alkyl methacrylate such as methyl, ethyl, propyl, and butyl methacrylates. Such polymers are well known articles of commerce and are prepared by solution, bulk or emulsion polymerization for the normally liquid monomers, or by gaseous polymerization by the high pressure or low pressure processes for ethylene, whereas suitable polypropylene is only commercially prepared by a low pressure process at this time.

The ethylenically unsaturated neutral monomers present in the copolymers of the compositions of this invention are those known to copolymerize in solution with initiation by peroxide or azo type catalyst and are "neutral" in the sense that they contain no acid groups which will assist in cross-linking the copolymers after they are formed. The said ethylenically unsaturated neutral monomers include styrene and the alkylated styrenes such as vinyl toluene and $\alpha$-methyl styrene, acrylic and methacrylic esters such as methyl, ethyl butyl and 2-ethyl hexyl acrylates and methacrylates, vinyl chloride and minor proportions of other species such as acrylonitrile, acrylamide or N-methylol acrylamide. The $\alpha,\beta$-ethylenically unsaturated acid monomers include acrylic and methacrylic acids, and maleic, fumaric, itaconic and crotonic acids. These latter monomers provide in the copolymers free acid groups which subsequently cross-link with the polyepoxide.

In order that the advantages of the present invention be fully obtained, it is preferred that the copolymerizable monomers be selected so that, in the absence of the preformed polymeric resin, the copolymer would give a hard film when cross-linked. Thus it is preferred that at least 20% by weight of the monomers be selected from the group of monomers yielding hard films, that is from styrene, vinyl toluene, vinyl chloride and methacrylate esters, or conversely that not more than 78% be an acrylate. Films made from compositions including copolymers containing more than 78% of acrylate esters tend to be quite soft, and any improvement in flexibility is not readily demonstrated by the bump and bend tests described hereinafter on metal panels. The hard films used for protective coatings are of course within the preferred class.

When the vinyl or acrylic monomers are copolymerized in the presence of a preformed polymeric resin of the type described, it is believed that the vinyl or acrylic copolymer is grafted onto the resin polymer chains. Thus the completed copolymer will be referred to hereinafter as a graft copolymer, without however restricting the invention to any particular theory or mechanism.

While graft copolymers of vinyl monomers onto rubbers are known (see for example U.S. Patent No. 2,908,661), it is believed to be an entirely novel discovery that, when the vinyl copolymers are grafted onto rigid polymeric resins and subsequently cross-linked to give hard infusible films, the properties of those films are greatly improved by as little as 2% by weight of the preformed polymeric resins. In particular, the resulting cross-linked films possess increased flexibility and still retain hardness and solvent resistance indistinguishable from those of the films containing the non-grafted copolymers.

The cross-linking reagents used in the compositions of this invention must contain on the average at least two epoxide groups per molecule. By epoxide group is meant the three membered cyclic inner ether represented by:

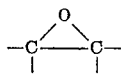

wherein the epoxy oxygen is joined to adjacent carbon atoms.

The cross-linking reagents are defined herein as polyepoxides and include both monomeric species such as vinyl cyclohexene dioxide and polymeric species such as the known epoxide resins. The latter are generally low molecular weight condensation products of epichlorohydrin and a polyhydric alcohol or phenol such as glycerol or diphenylol propane (bis-phenol A). It is preferred that the polyepoxide have an epoxide content of at least 7.5% by weight, a melting point not exceeding 75° C. and a Gardner viscosity not exceeding 1.65 poises as a 40% solution in ethylene glycol dibutyl ether.

The basic catalyst used to catalyse the cross-linking reaction in the coating compositions of this invention may be selected from a wide variety of compounds of known efficiency. For conventional coatings applied from organic solution, basic organic nitrogen compounds are preferred. Inorganic bases may also be used, and particularly if the acid-containing copolymer is rendered dispersible or soluble in water by the method of copending Canadian application Serial No. 792,948, inorganic bases such as caustic soda or preferably water soluble amines such as triethylamine may be used as the cross-linking catalyts. However, for coatings applied from organic solution, the preferred catalysts are organic bases such as tertiary amines and quaternary ammonium hydroxides wherein at least one of the alkyl groups attached to the nitrogen atoms has between 12 and 18 carbon atoms. Such organic bases should be present in a concentration of from about $\frac{1}{10}$ to about $\frac{1}{100}$ of an equivalent, based on the acid in the copolymer. As an alternative in certain cases, the catalyst can be included as a nitrogen-containing monomer in the copolymer. For example, in Canadian Patent No. 534,001, vinyl pyridine is included in an acid-containing copolymer and acts as a catalyst for subsequent cross-linking by a polyepoxide. Dimethylaminoethyl methacrylate will also serve the same purpose.

The catalysts or initiators employed in the graft copolymerization in the process of this invention are those commonly employed in vinyl-type solution polymerizations. They include the hydroperoxides of generic formula R—OOH, the dialkyl peroxides R—O—O—R, where R is an alkyl radical, and also the acetyl, benzoyl and similar peroxides

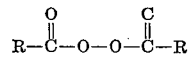

where R may be a linear or branched chain aliphatic radical or an aromatic hydrocarbon radical. Other known vinyl polymerization initiators include the azo type of formula

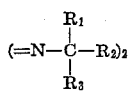

where $R_1$ is a lower alkyl or cycloalkyl radical, $R_2$ is a lower alkyl, cycloalkyl or acyl radical and $R_3$ is in a carbonitrile, carbonamide or carbalkoxy radical. Suitable catalysts thus include acetyl peroxide, benzoyl peroxide, tertiary butyl perbenzoate, lauryl peroxide, dibutyryl peroxide, tertiary butyl hydroperoxide, cumene hydroperoxide, azo-bis (isobutyronitrile) and azo-bis (isobutyrocarbonamide).

The following examples are given to illustrate the inventive coatings, coating compositions and the processes of preparing them. The examples are only illustrative and are not to be construed as limiting the scope of the invention.

EXAMPLE 1

A graft of a vinyl toluene/ethyl acrylate/acrylic acid copolymer onto nominally 5% of a commercial polystyrene was made in the following manner.

A solution of 420 g. of xylene and 20 g. of "Styron" polystyrene moulding powder was brought to reflux. Then the following 4 monomer charges were added successively over 1 hour to the refluxing solution:

|  | (1) | (2) | (3) | (4) |
|---|---|---|---|---|
| Vinyl toluene, g | 72 | 72 | 72 | 72 |
| Ethyl acrylate, g | 20 | 20 | 20 | 20 |
| Acrylic acid, g | 5.3 | 6.4 | 8.7 | 11.2 |
| Benzoyl peroxide, g | 1 | 1 | 1 | 1 |
| Tert.-butyl hydroperoxide,*g | 1.6 | 1.6 | 1.6 | 1.6 |

*A 60% solution in isopropanol.

The reaction solution was kept at reflux for another 4 hours. Then 84 g. of xylene, water and unreacted monomers were distilled off and 84 g. of butanol put back. The resulting solution had a total solids value of 49%.

In a similar manner copolymers were prepared in the presence of two grades of polyethylene and of varying amounts of poly(vinyltoluene). The resulting graft copolymers were mixed in solution with an epoxy resin (defined hereinbefore) in an amount such that one equivalent of the epoxide group was present for each equivalent of acid, and a basic catalyst added ($\frac{1}{34}$ equivalent based on acid). The epoxide resin was "Epon 828," being a condensation product of epichlorohydrin and diphenylol propane, and the catalyst was a teritary amine having one long chain substituent (coconut oil residue) and two methyl substituents. The resulting solutions were pigmented with a TiO pigment at 1:1 pigment:binder ratio, and after spraying onto phosphated steel panels, were baked at 150° C. for 30 minutes. The results are compared in Table I.

*Table I*

| Rigid polymer | Coin scratch | 90° bend | Bump test | | Thickness, mils |
|---|---|---|---|---|---|
| | | | In | Out | |
| None | 4 | 3 / 0 | 5 / 5 | 3 / 0 | 1.5 / 2.0 |
| 5% polystyrene | 4 | 6 / 5 | 8 / 7 | 6 / 5 | 1.5 / 2.0 |
| 2% polyethylene mol. wt. about 15,000 | 4 | 6 / 6 | 8 / 7 | 7 / 6 | 1.5 / 2.0 |
| 2% polyethylene mol. wt. about 30,000 | 4 | 7 / 6 | 8 / 7 | 7 / 7 | 1.5 / 2.0 |
| 5% polyethylene mol. wt. about 30,000 | 4 | 8 / 7 | 8 / 7 | 8 / 7 | 1.5 / 2.0 |
| 2% poly(vinyl toluene) | 4 | 6 / 5 | 7 / 6 | 7 / 6 | 1.5 / 2.0 |
| 5% poly(vinyl toluene) | 4 | 6 / 5 | 8 / 7 | 7 / 5 | 1.5 / 2.0 |
| 10% poly(vinyl toluene) | 4 | 7 / 6 | 8 / 7 | 8 / 6 | 1.5 / 2.0 |

From these results it can be seen that the hardness of the coating as shown by the coin scratch test was unaffected by the inclusion of the grafted rigid polymer, whereas the flexibility was improved. Thickness was also measured, since apparent flexibility was affected by thickness variations. The bend test was a simple 90° bend of the panel over a sharp edge, whereas the bump test was an impact of 36 inch lbs. energy by a hemisphere of $\frac{5}{8}$ inch diameter. The results were rated visually, 10 being no defects; at about 8 minor cracking was observed at the apex of the bump; at about 5 the cracking extended part way down the bump; at about 3 the cracking extended around the bottom of the bump; and at 0 some flaking started. A similar scale was used for the 90° bend test results.

EXAMPLE 2

In a manner similar to that of Example 1, vinyl toluene/ethyl acrylate/acrylic acid copolymers were made in the presence of 2% of poly(methyl methacrylate). The properties of resultant epoxide cross-linked coatings are given in Table II.

*Table II*

| Rigid polymer | Coin scratch | 90° bend | Bump test | | Thickness, mils |
|---|---|---|---|---|---|
| | | | In | Out | |
| None | 4 | 3 | 5 | 2 | 1.5 |
| 2% poly(methyl methacrylate) | 4 | 5 | 6 | 5 | 1.5 |

EXAMPLE 3

This example illustrates the lower amounts of polyepoxide which may be used in the coating compositions of the present invention. The experimental details are the same as in Example 1 except for the polyepoxide. The results are given in Table III.

*Table III*

| Rigid polymer | Epoxide and wt. percent | Coin scratch | 90° bend | Bump test | | Thickness mils |
|---|---|---|---|---|---|---|
| | | | | In | Out | |
| None | "Epon 562" 17% | 4 | 5 / 3 | 3 / 2 | 3 / 0 | 1.5 / 2.0 |
| Do | "Epon 562" 8.5% | 4 | 5 / 3 | 3 / 2 | 2 / 0 | 1.5 / 2.0 |
| 5% polystyrene | "Epon 562" 8.0% | 4 | 5 / 3 | 5 / 3 | 6 / 2 | 1.5 / 2.0 |

"Epon 562" is a liquid resinous polyepoxide condensation product of epichlorohydrin and glycerol.

It can be seen that the reduction in the amount of polyepoxide does not affect the hardness of the film as shown by the coin scratch test, while an improvement in flexibility (bump test) is shown when only 5% of a rigid resin is present during the copolymerization.

EXAMPLE 4

Further evidence for improved flexibility of the last sample of the previous example is given by "free-film" tests. In these a film was laid down on tin foil and the tin backing dissolved away with mercury. The resultant films were 2 mils thick and the force required to extend them at ¾ inch per minute was measured. It will be seen from the results of Table IV that the inclusion of 5% polystyrene did not affect the strength of the film but reduced the elastic (Young's) modulus, showing improved flexibility.

*Table IV*

| Rigid polymer | Tensile strength p.s.i. | Young's modulus, p.s.i. |
|---|---|---|
| None | $9.3 \times 10^3$ | $3.0 \times 10^5$ |
| 5% polystyrene | $9.3 \times 10^3$ | $2.7 \times 10^5$ |

What I claim is:

1. A coating composition adapted to form a hard but flexible coating upon baking on a substrate which contains as essential ingredients (a) a copolymer of from 2 to 15 parts by weight of an $\alpha,\beta$-monoethylenically unsaturated carboxylic acid and from 85 to 98 parts by weight of monoethylenically unsaturated monomer copolymerizable therewith and having ethylenic unsaturation as sole reactive group, the total parts being 100, the said acid and monomer having been copolymerized in the presence of from 2 to 20 parts by weight of a polymeric resin selected from the group consisting of polystyrene, poly(vinyltoluene), polyethylene of molecular weight greater than 10,000, and poly(methylmethacrylate); (b) from 5% to 55%, by weight of said copolymer, of an epoxidized material containing at least two epoxide groups per molecule; and (c) a basic catalyst.

2. A coating composition as claimed in claim 1 wherein the copolymer is a copolymer of 72 parts of vinyl toluene, 20 parts of ethyl acrylate and 8 parts of acrylic acid, the parts being by weight and totalling 100.

3. A substrate having as a coating thereon a heat hardened film of the coating composition of claim 1.

References Cited by the Examiner

UNITED STATES PATENTS

| | | | |
|---|---|---|---|
| 2,604,464 | 7/1952 | Segall et al. | 260—837 |
| 2,926,126 | 2/1960 | Graham et al. | 260—881 |
| 3,035,008 | 5/1962 | Gaylord | 260—855 |
| 3,118,853 | 1/1964 | Hart et al. | 260—851 |

MURRAY TILLMAN, *Primary Examiner.*

WILLIAM H. SHORT, *Examiner.*